US012498242B2

(12) United States Patent
Yoshikawa et al.

(10) Patent No.: US 12,498,242 B2
(45) Date of Patent: Dec. 16, 2025

(54) INFORMATION PROCESSING SYSTEM AND INFORMATION PROCESSING METHOD

(71) Applicant: MICWARE CO., LTD., Kobe (JP)

(72) Inventors: Sumito Yoshikawa, Kobe (JP); Shigehiko Miura, Kobe (JP)

(73) Assignee: MICWARE CO., LTD., Kobe (JP)

( * ) Notice: Subject to any disclaimer, the term of this patent is extended or adjusted under 35 U.S.C. 154(b) by 289 days.

(21) Appl. No.: 17/981,900

(22) Filed: Nov. 7, 2022

(65) Prior Publication Data

US 2023/0066144 A1    Mar. 2, 2023

Related U.S. Application Data

(63) Continuation of application No. PCT/JP2021/016650, filed on Apr. 26, 2021.

(30) Foreign Application Priority Data

May 8, 2020  (JP) ................................ 2020-082859

(51) Int. Cl.
*G01C 21/36*  (2006.01)
*G08G 1/01*  (2006.01)
(Continued)

(52) U.S. Cl.
CPC ......... *G01C 21/3682* (2013.01); *G08G 1/012* (2013.01); *H04N 7/183* (2013.01)

(58) Field of Classification Search
None
See application file for complete search history.

(56) References Cited

U.S. PATENT DOCUMENTS

2018/0058863 A1\*  3/2018  Meyer ................ G01C 21/3415
2018/0283897 A1\*  10/2018  Wang ................. G06Q 30/0214
(Continued)

FOREIGN PATENT DOCUMENTS

JP    2007-108119 A    4/2007
JP    2019-100802 A    6/2019
(Continued)

OTHER PUBLICATIONS

Lequerica, Iván et al., "Drive and share: efficient provisioning of social networks in vehicular scenarios," Nov. 4, 2010, IEEE, vol. 48 Issue 11, pp. 90-97 (Year: 2010).\*

(Continued)

*Primary Examiner* — Madison R. Inserra
(74) *Attorney, Agent, or Firm* — Birch, Stewart, Kolasch & Birch, LLP

(57) ABSTRACT

A server collects image pickup data picked up by an image pickup device that is held by a moving body. The server generates spot information in which information regarding a spot specified based on a post in a social networking service is associated with position information indicating a position of the spot and transmits the spot information to an information display device. The information display device displays a screen including first information for receiving a request for image pickup data regarding the spot information, and transmits request information including the position information of the spot information to the server when the first information is selected by a user. The server collects image pickup data picked up by the image pickup device in a region that satisfies a condition for the position indicated by the position information in the request information and transmits the collected data to the information display device.

6 Claims, 12 Drawing Sheets

(51) Int. Cl.
*G08G 1/0967* (2006.01)
*G08G 1/0968* (2006.01)
*H04N 7/18* (2006.01)

(56) References Cited

U.S. PATENT DOCUMENTS

| | | | |
|---|---|---|---|
| 2019/0189004 A1 | 6/2019 | Suzuki | |
| 2020/0058217 A1* | 2/2020 | Ishikawa | G08G 1/096791 |
| 2020/0359181 A1* | 11/2020 | Kusumoto | H04W 4/44 |
| 2021/0216928 A1* | 7/2021 | O'Toole | G06F 16/29 |

FOREIGN PATENT DOCUMENTS

| | | |
|---|---|---|
| JP | 2019-105470 A | 6/2019 |
| JP | 2019-109708 A | 7/2019 |
| JP | 2019-179298 A | 10/2019 |
| JP | 2020-42025 A | 3/2020 |

OTHER PUBLICATIONS

International Search Report (PCT/ISA/210) issued in PCT/JP2021/016650, dated Jul. 13, 2021.
Japanese Office Action dated Sep. 5, 2023 for Application No. 2022-519932 with an English translation.

* cited by examiner

| POINT NAME | POSITION INFORMATION |
|---|---|
| TOWN A | $x_a, y_a$ |
| VILLAGE B | $x_b, y_b$ |
| ... | ... |
| HALL C | $x_n, y_n$ |
| ... | ... |

| SPOT NAME | POSITION INFORMATION | POST INFORMATION | CATEGORY | MEDIA INFORMATION |
|---|---|---|---|---|
| TRAFFIC CONGESTION | x1, y1 | TRAFFIC CONGESTION DUE TO ACCIDENT AT POINT A | NEWS | A0001 |
| RAMEN N | x2, y2 | RAMEN N IS DELICIOUS | RESTAURANT | – |
| ⋮ | ⋮ | ⋮ | ⋮ | ⋮ |

| DATE AND TIME | IMAGE PICKUP POSITION INFORMATION | IMAGE PICKUP DATA |
|---|---|---|
| 2020/04/22 | $x_3, y_3$ | IMAGE PICKUP DATA 1 |
| 2020/04/22 | $x_4, y_4$ | IMAGE PICKUP DATA 2 |
| ... | ... | ... |

INFORMATION PROCESSING SYSTEM AND INFORMATION PROCESSING METHOD

CROSS-REFERENCE TO RELATED APPLICATIONS

This application is a continuation application of International Application of PCT/JP2021/016650 filed on Apr. 26, 2021 and designated the U.S., which claims the benefit of priority of the prior Japanese Patent Application No. 2020-082859, filed on May 8, 2020, the entire contents of both of which are incorporated herein by reference.

FIELD

The present invention relates to an information processing system and an information processing method.

BACKGROUND

In recent years, a car navigation device on which a dashboard camera is mounted and a car navigation device that operates in coordination with a dashboard camera are utilized.

As an information processing system to be used in this kind of car navigation device, an information display system related to collection and display of information regarding traffic congestion is known (for example, Patent Document 1 and Patent Document 2).

In the information display system of Patent Document 1 and Patent Document 2, even if information is not provided as traffic congestion information, flow of traffic on a road in a traveling direction can be checked by utilizing video information captured by other vehicles.

Patent Document 1: Japanese Patent Laid-Open No. 2019-100802
Patent Document 2: Japanese Patent Laid-Open No.

SUMMARY

An information processing system according to one aspect of the present invention includes a server and an information display device. The server includes a first processor, a storage device and a first communication device. The first processor collects image pickup data picked up by an image pickup device that is held by a moving body and picks up an image around the moving body. The first processor generates spot information in which information regarding a spot specified on the basis of a post posted on a social networking service is associated with position information indicating a position of the spot. The storage device stores the spot information. The first communication device transmits the spot information to the information display device. The information display device includes a screen display device and a second communication device. The screen display device displays a screen including first information for receiving a request for image pickup data regarding the spot information. When the first information is selected by a user on the screen, the second communication device transmits request information including the position information of the spot information to the server. When the first communication device receives the request information from the information display device, the first processor collects image pickup data picked up by the image pickup device in a region that satisfies a predetermined condition for the position indicated by the position information included in the request information, and the first communication device transmits the image pickup data picked up by the image pickup device in the region that satisfies the predetermined condition to the information display device.

BRIEF DESCRIPTION OF DRAWINGS

FIG. 4 illustrates an example of point name information according to the embodiment;
FIG. 5 illustrates an example of spot management information according to the embodiment;
FIG. 6 illustrates an example of image pickup data management information according to the embodiment.

DESCRIPTION OF EMBODIMENTS

Figure 1:
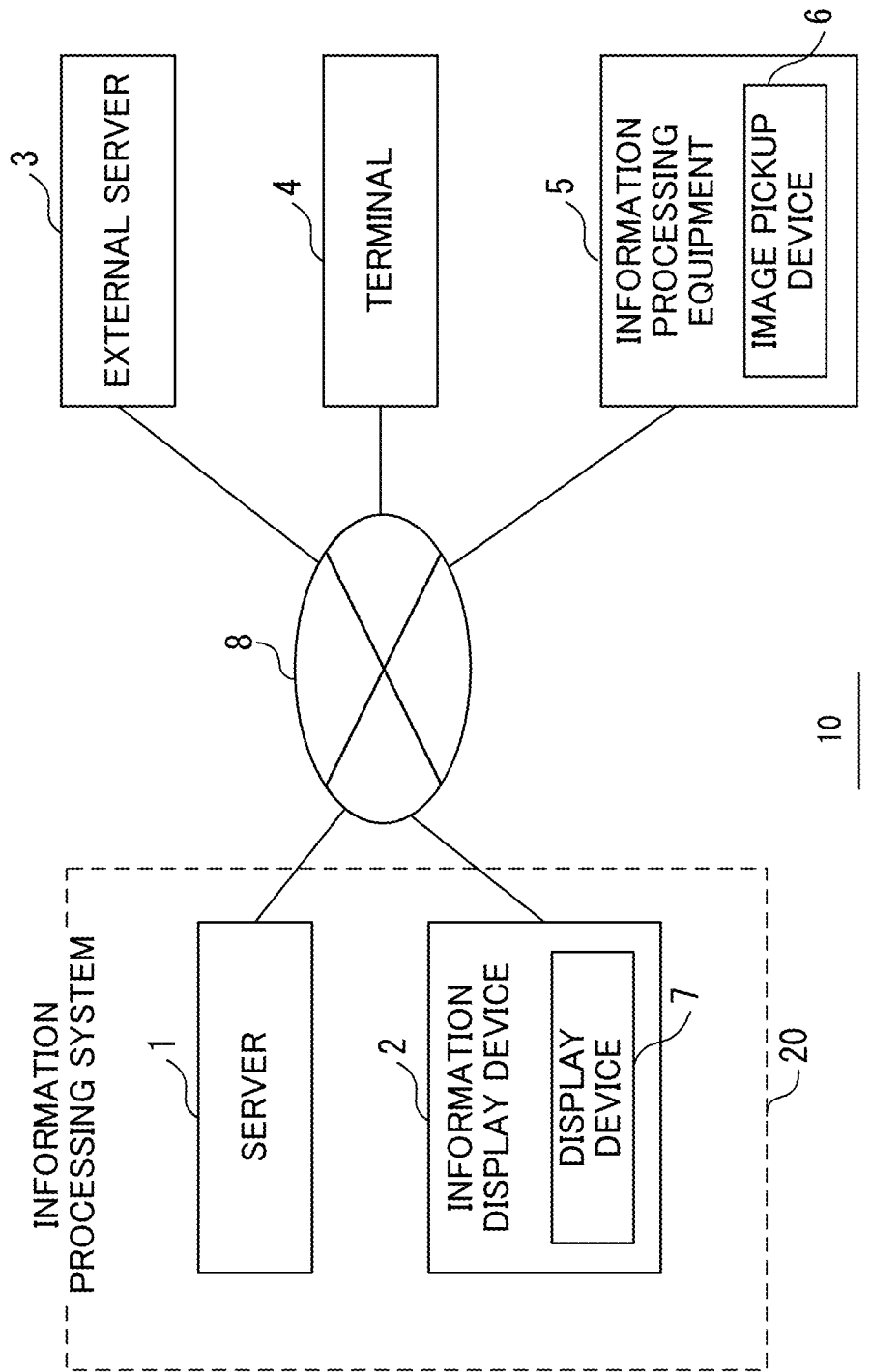
FIG. 1 illustrates an example of a system in which an embodiment is utilized.

Some embodiments of the present invention will be described in detail below with reference to the drawings. Note that the same reference numerals will be assigned to corresponding components among a plurality of drawings.

Currently, it is demanded that a wider range of information be provided more quickly, which means that configurations in Patent Document 1 and Patent Document 2 are not sufficient, and further improvement is desired.

FIG. 1 illustrates an example of a system 10 in which the embodiment is utilized. The system 10 includes, for example, a server 1, an information display device 2, an external server 3, a terminal 4 and information processing equipment 5. The server 1, the information display device 2, the external server 3, the terminal 4 and the information processing equipment 5 are, for example, information processing devices (computers). The server 1, the information display device 2, the external server 3, the terminal 4 and the information processing equipment 5 are, for example, connected to a network 8. Examples of the network 8 can include the Internet and a public communication network. For example, the terminal 4, which is connected to the network 8 via a wireless base station and a relay device, can perform mutual communication with the external server 3. The server 1 can, for example, perform mutual communication with the information display device 2, the external server 3 and the information processing equipment 5 via the network 8.

The external server 3 is, for example, a server that provides a social networking service (SNS). Examples of the SNS can include Twitter (registered trademark), FACEBOOK (registered trademark), INSTAGRAM (registered trademark), YouTube (registered trademark) and LINE (registered trademark). The SNS may include a blog or a bulletin board network in a broader sense. In the SNS, for example, a message posted by a user is published. For example, in the SNS, there is a case where feedbacks and feelings of posters for various spots such as restaurants and sightseeing spots are posted. Further, there is also a case where, for example, messages related to occurrence of incidents and accidents and traffic congestion are posted on the SNS.

The terminal 4 is, for example, a terminal to be utilized by a user who makes a post on the SNS. The terminal 4 is, for example, a smartphone, a mobile phone, a tablet terminal, a personal computer, or a mobile computer. For example, the terminal 4 can access the external server 3 by operation by the user and post a message, an image and a moving image on the SNS.

The information processing equipment 5 is a device including the image pickup device 6. The information processing equipment 5 is, for example, equipment held by a moving body. The information processing equipment 5 may be, for example, in-vehicle equipment mounted on a vehicle. The moving body is, for example, an automobile, a motorcycle, a bicycle or a snowmobile. The moving body may include a person or a drone. The image pickup device 6, for example, picks up an image around the moving body. The image pickup device 6 may pick up an image inside the moving body. Examples of the image pickup device 6 can include a camera or a dashboard camera mounted on the moving body. The dashboard camera includes a camera, and, for example, is attached to a windshield. The dashboard camera, for example, records a video around the moving body and stores the video. The dashboard camera may, for example, record a video inside the moving body and store the video. The dashboard camera is configured, for example, to be able to record a video and a speech during driving of the moving body. The stored video and speech can be utilized for, for example, grasping a situation in a case where a trouble occurs. The trouble is a traffic accident and a quarrel with others as an example. The image pickup data picked up by the image pickup device 6 may include, for example, an image, a video and a speech. In other words, examples of the image pickup data can include a still image and a moving image. The information processing equipment 5 may include, for example, a positioning sensor that measures a position. Examples of the positioning sensor can include a global positioning system (GPS) sensor. The information processing equipment 5 can add image pickup position information indicating a position at which the image is picked up to the image pickup data by utilizing the positioning sensor. The image pickup position information may be a position indicating a location at which the image is picked up or may be a position of an image pickup target. The position of the image pickup target can be specified, for example, by utilizing metadata included in the image. The information processing equipment 5 may include a navigation device as well as the dashboard camera. Further, the information processing equipment 5 may operate in coordination with a navigation device mounted on the same moving body. The navigation device may have the same structure as the structure of the information display device 2. In the embodiment, the information processing equipment 5, for example, provides the image pickup information including the image pickup data picked up by the image pickup device 6, image pickup time and the image pickup position information to the server 1 via the network 8.

The information display device 2 is, for example, held by the moving body. The information display device 2 is, for example, a navigation device having a function of giving a route guidance. The information display device 2 may include, for example, a route search unit 28 that searches for a route from a current place of the moving body to a destination. The information display device 2, for example, gives a route guidance from the current place of the moving body to the destination. The information display device 2 may have a function of, for example, providing information on a spot around the route when giving a route guidance from the current place to the destination. By the information on the spot around the route being provided, the user can, for example, drop by the presented spot on the way to the destination. The moving body on which the information display device 2 is mounted is, for example, a vehicle such as an automobile, a motorcycle, a bicycle and a snowmobile. Further, the moving body that holds the information display device 2 may be a person. In other words, the information display device 2 may be, for example, a terminal held by a person such as a smartphone, a tablet terminal and a mobile computer. The information display device 2 includes, for example, a display device 7. The display device 7, for example, causes a route to be displayed on a map so as to be able to give a route guidance from the current place to the destination. Note that the information display device 2 may operate in coordination with the dashboard camera mounted on the same moving body. The dashboard camera may have the same structure as the structure of the information processing equipment 5. The information display device 2 may collect the image pickup data picked up by the image pickup device 6 provided at the dashboard camera.

The server 1, for example, searches for a spot around the route from a current position to a position of a destination of the moving body on which the information display device 2 is mounted in response to a request from the information display device 2. The server 1, for example, only requires to be able to search for a spot within a predetermined distance from the route along the route. The server 1, for example, transmits information on the spot found through the search to the information display device 2.

The information display device 2 can cause the information on the spot received from the server 1 to be displayed on the display device 7. The information display device 2 can provide to the user, the information on the spot which becomes a candidate that the user may drop by when the user moves to the destination.

Hereinafter, there is a case where the information on the spot provided by the server 1 is referred to as spot information. The spot information is information on a specific location. The spot information includes, for example, a position of the spot and information regarding the spot. In other words, the spot information is, for example, a Point Of Interest (POI). The POI is, for example, information regarding a specific location that is felt convenient or interesting by someone.

Further, the server 1, for example, collects information on posts posted on the SNS from the external server 3. The server 1 generates the spot information on the basis of the posts posted on the SNS. By generating the spot information from the information of the posts posted on the SNS, the server 1 can reflect information on hot spots which are hot in the world in the spot information in real time. In other words, the server 1 can dynamically provide fresh spot information in accordance with an area or a season to the user. Note that the spot information generated from information on posts posted on the SNS may be referred to as a dynamic POI as an example, because the information can be dynamically provided. The dynamic POI means information that dynamically changes in a relatively short period, for example, on a monthly basis, on a weekly basis, on a daily basis, on an hourly basis or by minutes. The server 1 can also manage the dynamic POI for each hour, for example, by temporally managing the collected information on the posts for each predetermined time zone.

There is a case where, for example, the user operates the terminal 4 to post a message regarding traffic congestion on the SNS service provided by the external server 3. For example, in a case where a message regarding traffic congestion is posted, the server 1 can collect information on posts regarding the traffic congestion from the external server 3, generate spot information regarding the traffic congestion from the posts regarding the traffic congestion and provide the spot information to the information display device 2.

However, in a case where posts regarding the traffic congestion are, for example, posts only including characters, there is a case where the user of the information display device 2 desires to check an actual situation of the traffic congestion with an image or a video. Further, there may be a time lag between occurrence of an event such as traffic congestion and posting on the SNS, and thus, it is desirable to provide a current situation of the traffic congestion to the user of the information display device 2. Still further, the user may, for example, desire to check a situation of traffic congestion in a point ahead on a moving route of the user of the information display device 2 rather than a point indicated by the spot information regarding the traffic congestion.

Thus, in the embodiment, if the information display device 2 receives an instruction to provide image pickup data from the user for the spot information regarding the traffic congestion, the information display device 2 requests the server 1 to provide image pickup information. The server 1, for example, acquires image pickup information picked up by the image pickup device 6 from the information processing equipment 5 of a moving body located around the point indicated by the spot information regarding the traffic congestion and provides the image pickup information to the information display device 2. Thus, the user of the information display device 2 can check a situation of the traffic condition by viewing an image or a video around the point indicated by the spot information regarding the traffic congestion. Note that in another example, the server 1 may, for example, extract spot information including image pickup information of a moving image or an image among other spot information located around the point indicated by the spot information regarding the traffic congestion and provide the spot information to the information display device 2.

In the embodiment, for example, the server 1 and the information display device 2 operate as an information processing system 20 that provides image pickup information on spot information regarding traffic congestion. The embodiment will be described in further detail below. Note that while description has been provided above using an example of information regarding traffic congestion, the embodiment is not limited to the information regarding traffic congestion. For example, the embodiment can be applied to information in a predetermined category such as traffic information, facility information and weather information.

Figure 2:
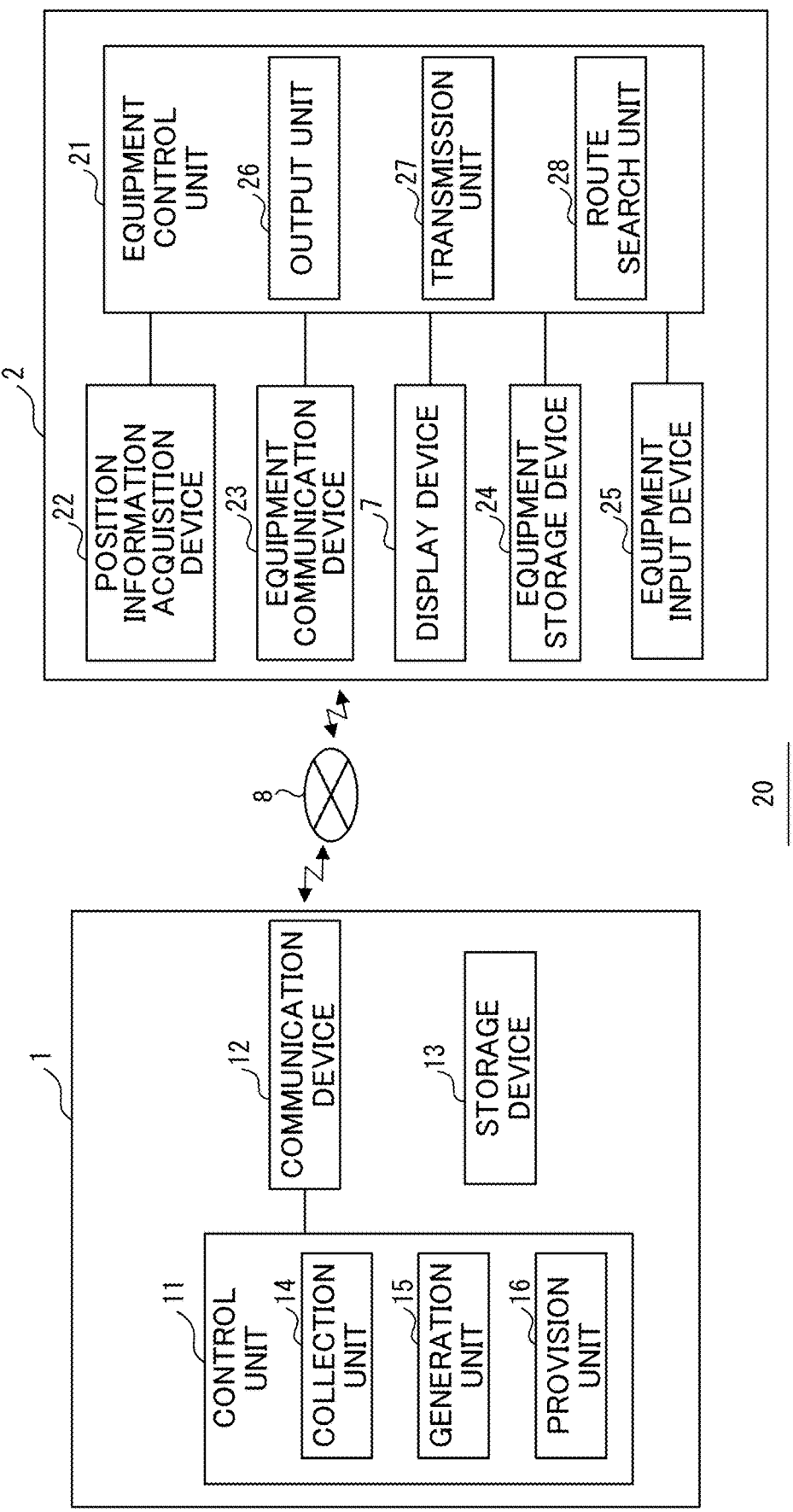
FIG. 2 illustrates an example of an information processing system according to the embodiment.

FIG. 2 illustrates an example of the information processing system 20 according to the embodiment. The information processing system 20 includes, for example, the server 1 and the information display device 2.

The server 1 includes, for example, a control unit 11, a communication device 12 and a storage device 13. The communication device 12 is an example of a first communication device.

The control unit 11, for example, controls the communication device 12. The control unit 11, for example, controls the communication device 12 to connect to the network 8. The control unit 11 may, for example, control the communication device 12 so as to be able to transmit/receive data to/from the information display device 2, the external server 3 or the information processing equipment 5. The control unit 11, for example, causes the communication device 12 to receive, from the information display device 2, a spot search request including information regarding a current position of the moving body including the information display device 2, a position of a destination, and a route from the current position to the position of the destination. The control unit 11, for example, searches for a surrounding spot along the route from the current position of the moving body on which the information display device 2 is mounted to the position of the destination in response to the spot search request from the information display device 2. The control unit 11, for example, controls the communication device 12 to transmit information on the spot found through the search to the information display device 2.

Further, the control unit 11 includes, for example, a collection unit 14, a generation unit 15 and a provision unit 16. The collection unit 14, for example, collects image pickup information including image pickup data picked up by the image pickup device 6 that picks up an image around the moving body from the information processing equipment 5 mounted on the moving body via the communication device 12. The collection unit 14 causes the storage device 13 to store the image pickup information.

The generation unit 15, for example, acquires a post posted on the SNS from the external server 3 via the communication device 12. The SNS, for example, provides a service of providing posted data via an application programming interface (API). Thus, the generation unit 15 can, for example, acquire data on the post posted on the SNS from the external server 3 using the API. The generation unit 15 generates spot information in which information regarding a spot specified on the basis of the post on the SNS collected from the external server 3 is associated with position information indicating a position of the spot. The generation unit 15 causes the storage device 13 to store the spot information.

In a case where a request for providing image pickup data is received from the information display device 2, the provision unit 16 controls the communication device 12 to provide the image pickup data to the information display device 2. The provision unit 16 may, for example, receive a request for providing image pickup data for spot information in a predetermined category and provide the requested image pickup data in the predetermined category to the information display device 2. The predetermined category includes, for example, traffic information, facility information or weather information. The request for providing image pickup data is, for example, information for requesting provision of the image pickup data associated using a predetermined text tag. The image pickup data requested in the request for providing image pickup data is, for example, image pickup data in the predetermined category corresponding to the spot information. Examples of the image pickup data in the predetermined category can include image pickup data regarding traffic information, facility information and weather information. Examples of the traffic information can include information indicating traffic congestion, an accident, construction work, flooding and road closure. Examples of the facility information include information indicating that a facility is crowded and information indicating that a facility is open or closed. Examples of the weather information include information indicating lightning, sudden rainfall and start of rainfall. The image pickup data may include, for example, metadata. The metadata is, for example, a text tag including text data. The text tag can be, for example, used to classify the image pickup data for each predetermined category. In other words, the image pickup data can be managed while being classified into categories indicating picked up images using text tags.

In a case where, for example, a request for providing image pickup data for spot information in a predetermined category is received from the information display device 2, the provision unit 16 provides image pickup data collected from the information processing equipment 5 of a moving body located in a region that satisfies a predetermined condition for a position indicated by the position information of the spot information, to the information display device 2. Note that there is a case where the moving body located in the region that satisfies the predetermined condition is referred to as a collection target moving body. The image pickup data to be provided in response to the request for providing image pickup data may be, for example, image pickup data in a predetermined category. The embodiment will be described below using an example of information regarding traffic congestion as an example of the predetermined category. However, the embodiment may be applied to spot information and image pickup data in other categories.

The storage device 13, for example, stores various kinds of information regarding processing of the server 1. The storage device 13, for example, stores map information, category information, point name information 40, spot management information 50 and image pickup data management information 60 which will be described later.

The information display device 2 includes, for example, an equipment control unit 21, a position information acquisition device 22, an equipment communication device 23, the display device 7, an equipment storage device 24 and an equipment input device 25. The equipment communication device 23 is an example of a second communication device, and the display device 7 is an example of a screen display device.

The equipment control unit 21, for example, controls each unit of the information display device 2. For example, the equipment control unit 21 controls the equipment communication device 23 to connect to the network 8. The equipment control unit 21, for example, controls the equipment communication device 23 so as to be able to transmit/receive data to/from the server 1. The equipment control unit 21 may control the equipment communication device 23 so as to be able to transmit/receive data to/from the external server 3 or the terminal 4 in addition to the server 1.

The equipment storage device 24, for example, stores various kinds of information regarding processing of the information display device 2. The equipment storage device 24, for example, stores map information. The equipment control unit 21, for example, causes a map indicated by the map information stored in the equipment storage device 24 to be displayed on the display device 7.

The position information acquisition device 22, for example, acquires position information indicating a position by utilizing a positioning satellite or a plurality of mobile phone base stations. The position information acquisition device 22 can, for example, acquire position information on the basis of information from the GPS sensor. The position information is, for example, expressed with a latitude and a longitude. The position information may include information on an altitude in addition to the latitude and the longitude. Time information at which the latitude and the longitude are specified may be added to the position information. The equipment control unit 21, for example, controls the position information acquisition device 22 to acquire position information indicating a current position of the moving body on which the equipment control unit 21 is mounted. Further, the equipment control unit 21, for example, causes information indicating the current position to be displayed on the map displayed on the display device 7 on the basis of the position information acquired from the position information acquisition device 22. Note that while an example has been described where the position information acquisition device 22 acquires position information indicating the current position of the moving body on which the information display device 2 is mounted, the embodiment is not limited. The position information acquisition device 22 may, for example, acquire position information of a position designated on the map displayed on the display device 7. The position on the map may be, for example, the center of the map or a specific point on the map.

The equipment input device 25 is, for example, a device that receives input to the information display device 2 by the user. The equipment input device 25 is, for example, an input key, a button, a keyboard, a pointing device, a microphone or a touch panel. In a case where an instruction to search for a route to the destination is input via the equipment input device 25, the equipment control unit 21, for example, searches for a route from the current position to the position of the destination using the Dijkstra's algorithm. The equipment control unit 21, for example, causes the searched route from the current position to the position of the destination to be displayed on the map displayed on the display device 7. In other words, the equipment control unit 21 includes a route search unit 28 that searches for a route from the current position to the position of the destination. Note that in a case where an instruction to search for a route, which designates a transit point in addition to the destination is input via the equipment input device 25, the equipment control unit 21, for example, searches for a route that goes through the transit point. The equipment control unit 21 may request the server 1 to search for a route from the current position to the destination and acquire the searched route from the server 1. In a case where the route is acquired in response to a request for searching for a route from the equipment control unit 21, the server 1 includes the route search unit 28.

Further, the equipment control unit 21 may, for example, control the equipment communication device 23 to transmit a spot search request to the server 1. The equipment control unit 21 may control the equipment communication device 23 so as to be able to receive spot information indicating a surrounding spot along the route from the server 1 in response to the spot search request. The spot search request includes, for example, the current position acquired at the position information acquisition device 22. The spot search request may include, for example, the position of the destination or the route from the current position to the destination in addition to the current position acquired at the position information acquisition device 22. The equipment control unit 21, for example, controls the display device 7 so as to display the spot indicated by the received spot information on the map.

Note that as described above, in the embodiment, the spot information is, for example, generated on the basis of a message posted on the SNS service provided by the external server 3. For example, in a case where a post regarding traffic congestion is made on the SNS service provided by the external server 3, spot information regarding the traffic congestion is generated.

In a case where the spot information regarding the traffic congestion is received from the server 1 in a response to the spot search request, the equipment control unit 21, for example, causes a spot indicated by the spot information regarding the traffic congestion to be displayed on the map displayed on the display device 7. The equipment input device 25, for example, receives selection by the user, of the spot indicating the spot information regarding the traffic congestion displayed on the display device 7. The display device 7 can cause information regarding the traffic congestion included in the spot information selected by the user at the equipment input device 25 to be displayed. Further, if the user, for example, inputs a request for checking image pickup data for the spot information to check an actual situation of the traffic congestion with an image or a video for the spot information regarding the traffic congestion to the equipment input device 25, the equipment control unit 21 causes the equipment communication device 23 to transmit a request for providing image pickup data to the server 1.

The server 1, for example, collects image pickup data picked at the image pickup device 6 from the information processing equipment 5. If the server 1 receives the request for providing image pickup data for the spot information regarding the traffic congestion, the server 1 provides image pickup data picked up at the image pickup device 6 of the information processing equipment 5 included in a region that satisfies a predetermined condition for the position indicated by the spot information regarding the traffic congestion, to the information display device 2. Thus, the equipment control unit 21 of the information display device 2, for example, can cause the image pickup data corresponding to the spot information regarding the traffic congestion to be displayed on the display device 7. The display device 7 allows the user to grasp a situation of the traffic congestion with an image or a video of the displayed image pickup data.

Note that the equipment control unit 21 of the information display device 2 includes, for example, an output unit 26 and a transmission unit 27. Further, the equipment control unit 21 of the information display device 2 may include, for example, the above-described route search unit 28. The output unit 26, for example, outputs image pickup data provided from the provision unit 16 of the server 1.

Further, as will be described later in a modification, for example, the information display device 2 may have a function of a dashboard camera. Further, for example, the information display device 2 may operate in coordination with the dashboard camera mounted on the same moving body. The dashboard camera may have the same structure as the structure of the information processing equipment 5. For example, the information display device 2 may collect image pickup data picked up at the image pickup device 6 provided at the dashboard camera. In a case where the information display device 2 has a function of a dashboard camera, the transmission unit 27 transmits image pickup information including the image pickup data picked up at the image pickup device 6 provided at the dashboard camera to the server 1 if there is spot information regarding the traffic congestion within a predetermined distance from the current position.

According to the embodiment, an information processing system capable of quickly utilizing a wider range of information is provided.

Figure 3:
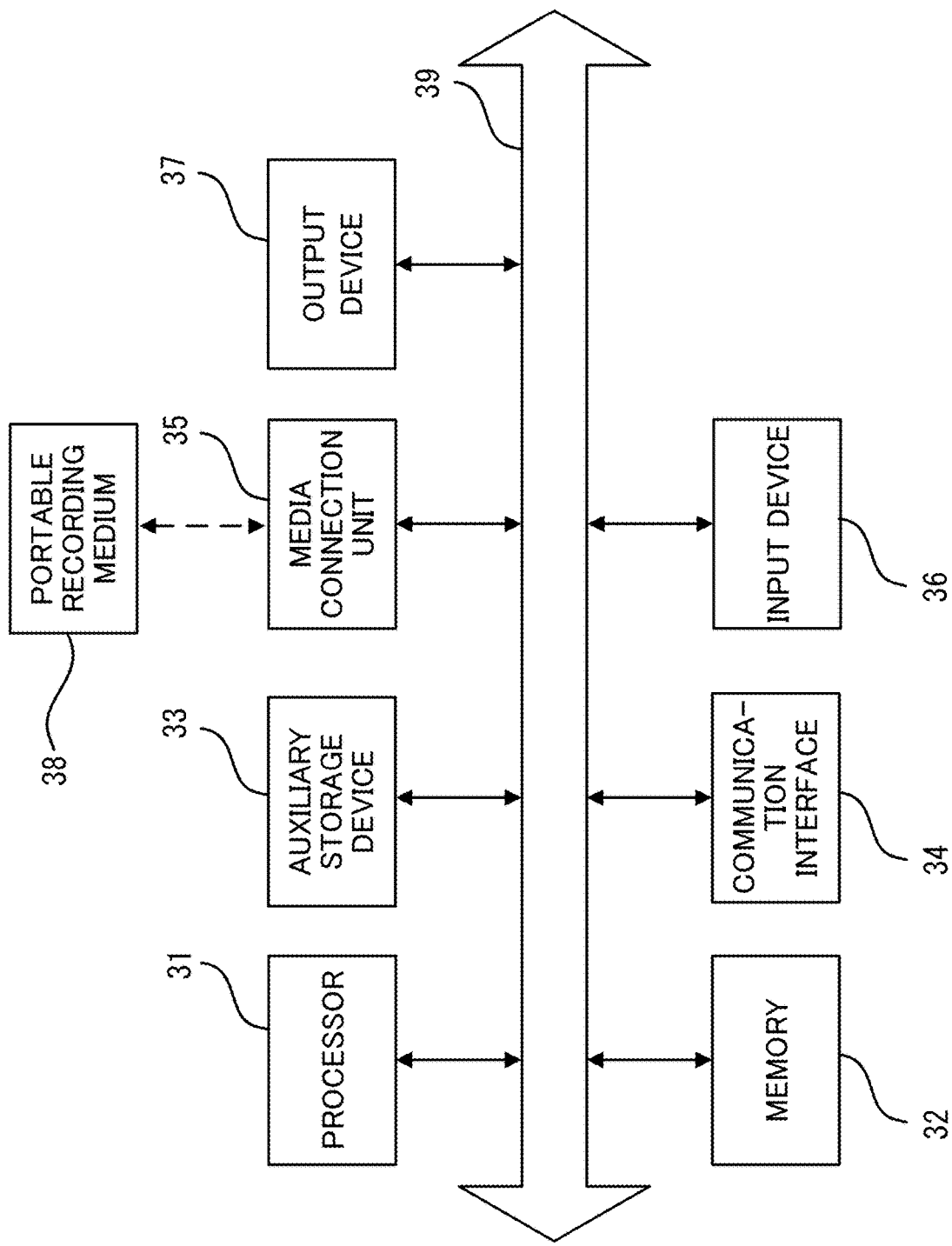
FIG. 3 illustrates an example of a hardware configuration of a server.

FIG. 3 illustrates an example of a hardware configuration of the server 1. As illustrated in the example in FIG. 3, the server 1 includes a processor 31, a memory 32, an auxiliary storage device 33, a communication interface 34, a media connection unit 35, an input device 36 and an output device 37 that are connected to a bus 39. The processor 31, the memory 32, the auxiliary storage device 33, the communication interface 34, the media connection unit 35, the input device 36 and the output device 37 are hardware.

The processor 31 executes a program loaded to the memory 32. The program to be executed includes an information processing program for performing processing in the embodiment.

The memory 32 is, for example, a random access memory (RAM). The auxiliary storage device 33, which is a storage device that stores various kinds of information, is, for example, a hard disk drive or a semiconductor memory. The auxiliary storage device 33 may store the information processing program for performing the processing in the embodiment.

The communication interface 34 converts data in association with communication in accordance with an instruction from the processor 31. The communication interface 34 is, for example, connected to the network 8 such as a local area network (LAN), a wide area network (WAN), the Internet and a public communication network to perform communication with other devices.

The media connection unit 35 is an interface to which a portable recording medium 38 can be connected. As the portable recording medium 38, for example, an optical disk and a semiconductor memory are applied. The portable recording medium 38 may store the information processing program for performing the processing in the embodiment.

The input device 36 is configured to be able to receive input of an instruction and information from the user. The input device 36 is, for example, an input key, a button, a keyboard, a pointing device, a microphone or a touch panel.

The output device 37 is a device for outputting an inquiry, an instruction, a processing result, and the like, to the user. The output device 37 is, for example, a display device, a printer or a speaker.

The storage device 13 of the server 1 illustrated in FIG. 2 is, for example, implemented by the memory 32, the auxiliary storage device 33 or the portable recording medium 38. The control unit 11, the collection unit 14, the generation unit 15 and the provision unit 16 of the server 1 illustrated in FIG. 2 are, for example, implemented by the processor 31 that executes the information processing program loaded to the memory 32. The processor 31 that implements the control unit 11, the collection unit 14, the generation unit 15 and the provision unit 16 of the server 1 is an example of a first processor. The communication device 12 of the server 1 illustrated in FIG. 2 is the communication interface 34 as an example.

The memory 32, the auxiliary storage device 33 and the portable recording medium 38 are computer-readable tangible recording media. The memory 32, the auxiliary storage device 33 and the portable recording medium 38 are not transitory media such as a signal carrier, but non-transitory storage media.

Note that the server 1 does not have to include all the components illustrated in FIG. 2, and some of the components may be omitted. Further, some of the components may exist in an external device outside the server 1, and the server 1 may utilize the components in the external device by connecting to the external device. In other words, the server 1 may implement each processing or each function through integrated processing by a single device or a single system or through distributed processing by a plurality of devices or a plurality of systems.

Further, the information display device 2, the external server 3, the terminal 4 and the information processing equipment 5 may include components similar to the components illustrated in FIG. 2 or does not have to include some of the components or may further include other components. For example, the information processing equipment 5 may include the image pickup device 6 that picks up images inside and around the moving body on which the information processing equipment 5 is mounted. The information display device 2 and the information processing equipment 5 may include, for example, a device of a GPS sensor for measuring a position. All of the information display device 2, the external server 3, the terminal 4 and the information processing equipment 5 may implement each processing or each function through integrated processing by a single device or a single system or through distributed processing by a plurality of devices or a plurality of systems.

A hardware configuration of the information display device 2 may be similar to the hardware configuration in FIG. 3. The equipment storage device 24 of the information display device 2 is, for example, implemented by the memory 32, the auxiliary storage device 33 or the portable recording medium 38 illustrated in FIG. 3. The equipment control unit 21, the output unit 26, the transmission unit 27 and the route search unit 28 of the information display device 2 are, for example, implemented by the processor 31 that executes the information processing program loaded to the memory 32, illustrated in FIG. 3. The processor 31 that implements the equipment control unit 21, the output unit 26, the transmission unit 27 and the route search unit 28 of the information display device 2 is an example of a second processor. The display device 7 is the output device 37 illustrated in FIG. 3 as an example. The equipment communication device 23 is the communication interface 34 illustrated in FIG. 3 as an example.

Subsequently, an example of information stored in the storage device 13 of the server 1 will be described. The storage device 13 of the server 1 may, for example, store map information. The map information is a digital map created by Geospatial Information Authority of Japan as an example. On the digital map, for example, a road network is expressed using nodes and links. The nodes are, for example, points arranged at curves of roads, intersections, and other nodal points on road network expression. Further, the links are, for example, lines representing roads connecting the nodes.

The storage device 13 of the server 1, for example, stores category information. The category information is information in which categories for classifying posts are associated with words belonging to the categories. The control unit 11 can, for example, specify a category of the post by specifying a word included in a message of the post and a category associated in the category information.

The storage device 13 of the server 1, for example, stores point name information 40. FIG. 4 illustrates an example of the point name information 40 according to the embodiment. In the point name information 40, for example, records in which point name is associated with position information are registered. The point name is, for example, information indicating name of a spot corresponding to a record. The position information is, for example, information indicating a position of a point corresponding to a record. The point name is, for example, address, name of municipality, store name, building name and facility name. The position information is, for example, expressed with a latitude and a longitude. The point name information 40 may be included in the map information.

The storage device 13 of the server 1, for example, stores the spot management information 50 illustrated in FIG. 5. In the spot management information 50, for example, a record of spot information indicating information on a spot generated on the basis of a post on the SNS is registered. The spot information to be registered in the spot management information 50 may include spot information regarding traffic congestion generated from a post regarding traffic congestion. In FIG. 5, for example, a record of the spot information with which spot name, a position, post information, a category and media information are associated is registered in the spot management information 50.

The spot name of the spot management information 50 is, for example, information indicating name of the spot corresponding to the record. The position information of the spot management information 50 is, for example, information indicating a geographical position of the spot corresponding to the record. The position information is, for example, expressed with a latitude and a longitude. As the post information, for example, information of a message of the post on the SNS used for generating the record is registered. Note that as the post information, information obtained by compressing a message written on the SNS by the user may be registered. The post information often includes, for example, a message related to the spot corresponding to the record. The category is, for example, information indicating a category of the spot corresponding to the record. The category can be, for example, classified into news, hot spring, park, art museum, shrine, live performance, shopping, amusement, outdoor, event, gourmet, ramen, and mountain. The category may include any classification. The category may be classified in accordance with feelings of the poster expressed in the post on the SNS used for generating the record. The media information is, for example, information on a medium included in the post on the SNS used for generating the record. The media information includes, for example, information on an image, a video and a speech.

Note that the information included in the spot information registered in the spot management information 50 is not limited to the information described above and may further include other information. For example, the spot management information 50 may include information of address of a spot corresponding to the record. The spot management information 50 may include, for example, a hashtag of the post on the SNS used for generating the record. The spot management information 50 may include, for example, date and time information indicating date and time of post on the SNS used for generating the record. In a case where the spot management information 50 includes date and time information, by causing only a record having date and time information within a predetermined period from current time to be stored in the storage device 13, it is possible to provide only latest information within the predetermined period to the information display device 2 as the spot information.

The spot management information 50 may include, for example, vector information obtained by vectorizing the spot information registered as the record. The vector information is, for example, specified so as to be able to be classified in accordance with the post information. Classification, for example, corresponds to feelings of "fun", "delicious", "impressed", "surprised" and "comforted".

The spot management information 50 may include, for example, information on favorite spots registered in advance by the user or spots that the user has visited, in association with the user.

The spot management information 50 may include, for example, scores obtained by scoring recommendation levels of spots of the spot information registered as the records. For example, the spot management information 50 may include scores obtained by performing morphological analysis on post information of the spot information registered as the records and performing scoring in accordance with feature words and feeling words included in the message, specified on the basis of the obtained morphemes. The server 1 can present a plurality of pieces of spot information registered in the spot management information 50 to the user while setting priorities on the basis of evaluation by scoring.

The storage device 13 of the server 1, for example, stores the image pickup data management information 60 illustrated in FIG. 6. In the image pickup data management information 60, for example, records of image pickup information with which date and time, image pickup position information and image pickup data are associated are registered. The date and time in the image pickup data management information 60 is, for example information indicating date and time on which the image pickup data corresponding to the record is picked up. The image pickup position information in the image pickup data management information 60 is, for example, information indicating a position regarding image pickup of the image pickup data corresponding to the record. The image pickup position information may be, for example, a position indicating an image pickup location or may be a position indicating an image pickup target. The position indicating the image pickup target can be specified, for example, by utilizing metadata included in the image. The image pickup position information is, for example, expressed with a latitude and a longitude. The image pickup position information may include an altitude in addition to the latitude and the longitude. The image pickup data in the image pickup data management information 60 is, for example, image pickup data collected from the information processing equipment 5 by the server 1, which is data on an image or a video. The image pickup data in the image pickup data management information 60 includes, for example, image pickup data obtained by picking up an image around the moving body on which the information processing equipment 5 is mounted with the image pickup device 6. Further, in the image pickup data management information 60, for example, a record corresponding to media information extracted from the post on the SNS may be registered. For example, in a case where the post on the SNS is a post related to traffic congestion and includes media information on an image or a video, a record associated with date and time and position information on the post regarding the traffic congestion may be registered in the image pickup data management information 60 using the media information as the image pickup data. The server 1 can, for example, acquire the image pickup data picked up at the information processing equipment 5 of the collection target moving body located in a region that satisfies a predetermined condition for a position of the spot indicated by the spot information regarding the traffic congestion from the image pickup data management information 60. Further, the control unit 11 of the server 1 can, for example, receive image pickup information including the image pickup data picked up by the image pickup device 6 of the information processing equipment 5, the image pickup date and time and the image pickup position information from the information processing equipment 5 by transmitting an instruction to the information processing equipment 5 and can register the image pickup information in the image pickup data management information 60. The storage device 13 may, for example, store map information.

Further, the equipment storage device 24 of the information display device 2, for example, stores map information.

Processing of generating spot information from the post on the SNS acquired from the external server 3 will be described below using FIG. 7.

Figure 7:
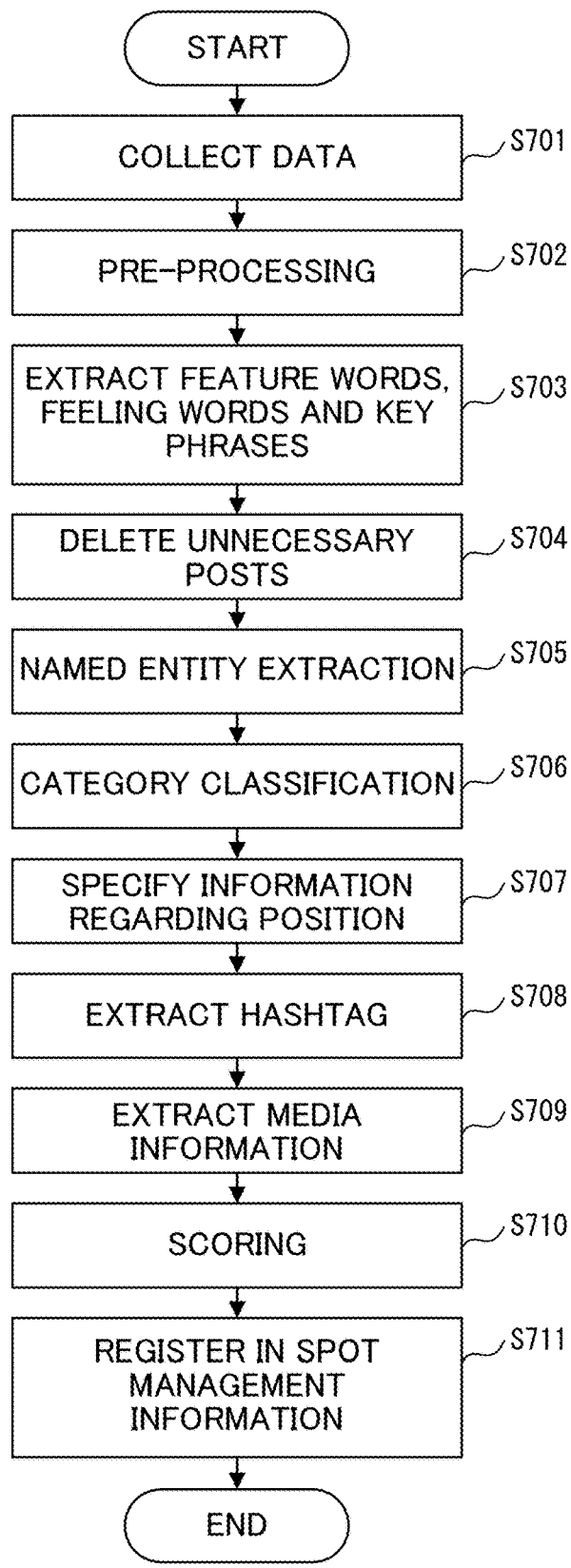
FIG. 7 illustrates an example of operation flow of spot information generation processing according to the embodiment.

The control unit 11 of the server 1, for example, starts operation flow in FIG. 7 if an instruction to execute processing of generating spot information is input.

In S701, the control unit 11 of the server 1 collects data of the posts on the SNS from the external server 3 via the communication device 12. The control unit 11 can, for example, collect data of the posts from the external server 3 via the API provided by the external server 3. The control unit 11 may collect data of all posts from the external server 3 or may collect data of some of the posts. Examples of the data of some of the posts can include latest posts posted in the last predetermined period or posts including information regarding a position of name of municipality. Note that the control unit 11 may, for example, acquire the information regarding the position of the name of the municipality from the point name information 40 and use the information to collect data of posts from the external server 3.

In S702, the control unit 11 executes pre-processing on messages of the collected posts. The pre-processing includes, for example, processing of deleting line break or uniform resource locator (URL) included in the posts. Further, the pre-processing may include, for example, processing of converting two-byte alphanumeric characters into one-byte characters and processing of normalizing or cleansing data. Still further, the pre-processing may include, for example, processing of performing morphological analysis on the posts and dividing the posts into morphemes. As the morphological analysis, for example, MeCab can be utilized.

In S703, the control unit 11 executes processing of extracting feature words, feeling words and key phrases from the posts. The feature words are, for example, terms that characterize the posted messages. The feeling words are, for example, words representing feelings and feedbacks of the posters who make posts, such as happy, sad and oh my god. Further, the feeling words may be, for example, expression of " . . . " from which feelings of the poster can be read in a message of a post of "traffic congestion on route 43 . . . ". The key phrases are, for example, characteristic phrases expressing a topic of the post well. In the processing of extracting key phrases, a "phrase" meaning a phrase is extracted using a series of a plurality of words instead of using a "word" meaning a word. Feature words, feeling words, and key phrases can be extracted using, for example, a dictionary of feature words, feeling words and key phrases created in advance or through machine learning. Feature words, feeling words and key phrases can be extracted, for example, on the basis of statistics and graphs.

In S704, the control unit 11 performs processing of deleting unnecessary posts. For example, a tweet such as "I'm at . . . " posted when a person checks in a hotel may be deleted, because the tweet does not include information useful for others.

In S705, the control unit 11 executes named entity recognition (NER) processing. The named entity recognition processing can be, for example, executed using GiNZA. For example, the control unit 11 can label a sentence by executing named entity recognition on a message of a post subjected to morphological analysis. Types of labels include, for example, the following.

Date: (example) Oct. 17, 2019
Event: (example) Fireworks event A
Location: (example) C city, B prefecture
Fee: (example) 780 yen
Number: (example) approximately 100 people
Organization, group: (example) event executive committee
Others: (example) typhoon No. 19
Person: (example) name, and the like
Item: (example) spring vegetable pasta
Time: (example) 18:00 to 19:00

Figure 8:
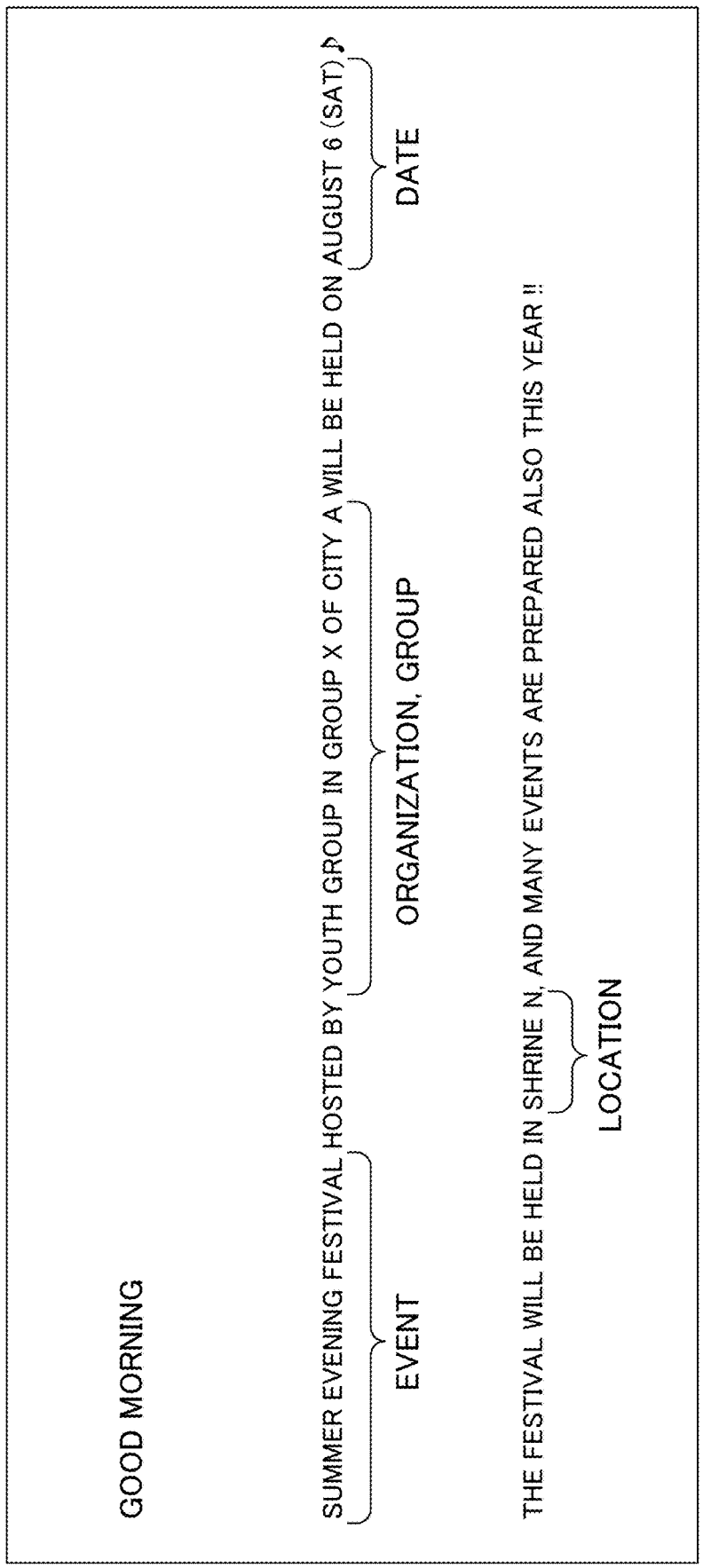
FIG. 8 illustrates an example of an execution result of named entity recognition for a message.

The control unit 11 can extract, for example, proper name indicating point name appearing in the message of the post and date and time information indicating date and time through named entity recognition. FIG. 8 illustrates an example of an execution result of named entity recognition performed on a message. As illustrated in FIG. 8, labels of "organization, group" and "event" are added to terms included in the message. Note that in the processing in S705, labels provided through named entity recognition may be further corrected by the user. In another embodiment, the control unit 11 may execute labeling through machine learning. The control unit 11 can execute analysis based on meanings of the message, such as "which restaurant serves the menu", "product" and "when it starts" by using the labels added to the message through named entity recognition. For example, the same term of "oh my god" is utilized in different meanings such as "had a delicious meal" and "stuck in something and incapable of moving". The control unit 11 can, for example, classify the meaning of the term of "oh my god" into meaning of "delicious" if the term to which a label of a location is added through named entity recognition indicates a restaurant.

In S706, the control unit 11 classifies categories of messages. The control unit 11 specifies a category associated with a word included in the message of the post with reference to the category information stored in the storage device 13. Further, the control unit 11 may specify a category of the post using machine learning. Types of categories may include classifications described above or may include the following classifications.

news
activity
event
cafe, tea room
shopping
museum
leisure
restaurant
experience
park, garden
zoo, aquarium
accommodation
exception
drinking spot, bar
scenery, sight
hot spring, spa, beauty salon treatment
shrine, temple In S707, the control unit 11 specifies information regarding a position. For example, the control unit 11 specifies spot name and position information from the message of the post. In one example, the control unit 11 searches the point name information 40 stored in the storage device 13 using the morpheme obtained as a result of the morphological analysis. In a case where a record in which the morpheme matches the point name is found, the control unit 11 specifies position information of the found record as position information of the spot. Further, the control unit 11 specifies point name of the found record as spot name in one example. Note that the spot name may be, for example, specified on the basis of content of the message of the post. For example, in a case where content of the post is a post regarding an accident and traffic congestion, there is a case where it is preferable to use content of the accident or information indicating occurrence of the traffic congestion as the spot name rather than using the point name as the spot name. Thus, the control unit 11 may determine information to be used as the spot name in accordance with content of the post such as a category of the post.

Further, one morpheme may be used for searching the point name information 40, or two or more morphemes may be used. The control unit 11 may extract a co-occurrence word that co-occurs from two or more words and perform search while replacing morphemes into a word having high similarity with words clustered from the co-occurrence word in advance for each spot. Here, co-occurrence refers to a predetermined word included in a message occurring concurrently with another word in the message. The co-occurrence word refers to another word occurring concurrently with the predetermined word. Further, the control unit 11 may specify spot name and position information corresponding to the post using machine learning. In another embodiment, the control unit 11 may execute search of the point name information 40 using a term to which a label of a location is added through named entity recognition as the spot name.

In S708, in a case where the post includes a hashtag, the control unit 11 extracts the hashtag from the post. In S709, in a case where the post includes media information, the control unit 11 extracts the media information from the post.

In S710, the control unit 11 executes scoring on the post. For example, the control unit 11 provides higher scores to more recent posts for date and time of posts. Further, the control unit 11, for example, provides higher scores to posts including positive content than scores to be provided to posts including negative content for content of the message of the post. The control unit 11, for example, provides higher scores in a case where the hashtag includes a hot word than in a case where the hashtag does not include a hot word for the hashtag of the post. The control unit 11, for example, provides higher scores to posts with a higher sense of appreciation for the beautiful for the media information on the post. The sense of appreciation for the beautiful can be evaluated using resolution in one example, and higher scores may be provided to higher resolution. The control unit 11, for example, determines a score for the post by synthesizing scores of date and time of the post, content of the message, the hashtag and the media information described above. The synthesized score may be, for example, a representative value representing a plurality of scores. The representative value may be, for example, a statistical value such as an average value, a median value, a mode value, a maximum value and a minimum value of a plurality of scores. The score represents a utility value of the post in one example.

In S711, the control unit 11 generates spot information corresponding to the post using the information obtained through the above-described processing, registers the spot information in the spot management information 50 and ends the present operation flow. The control unit 11, for example, registers the spot information including information of the spot management information 50 illustrated in FIG. 5. Further, when the control unit 11 registers the spot information in the spot management information 50, the control unit 11 may register the spot information in the spot management information 50 after rearranging the spot information on the basis of the scores determined in S710. By rearranging the spot information on the basis of the scores, spot information with a high utility value can be efficiently provided to the user. In the processing in S711, the control unit 11, for example, operates as the generation unit 15.

Note that the information included in the spot information is not limited to the example illustrated in FIG. 5, and part of the information does not have to be included, or additional information may be included. For example, the control unit 11 may include the score specified in S710 in the spot information. The control unit 11 may, for example, include information of the date and time and the hashtag of the post on the SNS used for generating the record in the spot management information 50.

Further, for example, a plurality of posts may be made for one spot, and thus, in one example, the control unit 11 may collectively register information of a plurality of posts for the same spot in the spot management information 50 as one piece of spot information. Whether or not the posts are made for the same spot can be, for example, determined using the spot name, the position information, the post information and the category information.

According to the operating flow in FIG. 7 described above, it is possible to generate spot information indicating information on the spot from data of the posts collected from the external server 3 and register the spot information in the spot management information 50.

Note that in a case where data on the posts collected from the external server 3 includes a post regarding traffic congestion, the spot information to be registered in the spot management information 50 may include spot information regarding the traffic congestion. The post regarding the traffic congestion can be, for example, specified from keywords representing traffic congestion such as "traffic congestion", "congestion", "crowded" and "cannot go forward". In the example of the spot management information 50 illustrated in FIG. 5, spot name of "traffic congestion" and a category of "news" are assigned to the spot information regarding the traffic congestion.

Note that posts categorized in news such as a post regarding traffic congestion and a post regarding an incident sometimes require instancy, and it is sometimes desirable to provide the posts to the user as quickly as possible. Thus, in one embodiment, in generation of spot information corresponding to a post categorized in news, part of the processing in FIG. 7 may be omitted. In one example, in generation of spot information corresponding to a post categorized in news, processing of named entity recognition in S705 may be omitted.

Subsequently, an example of provision of information on the spot registered in the spot management information 50 will be described. For example, the control unit 11 of the server 1 provides spot information that matches a required condition in response to a request for providing information on a spot from the information display device 2. Note that the spot information includes, for example, information that requires instancy or information for which a timing at which information is preferably presented to the user is limited, such as information on traffic congestion and information on news regarding an incident. For example, if information on traffic congestion is provided to the user after time elapses and the traffic congestion is resolved, erroneous information is provided to the user. Thus, the control unit 11 of the server 1 may provide a restriction on a period during which the information is provided in accordance with types of information when the control unit 11 provides spot information that matches a required condition in response to a request for providing spot information from the information display device 2. For example, if the information is information on traffic congestion, the control unit 11 may provide spot information generated on the basis of the post posted on the SNS within a predetermined period from time at which a request for providing spot information is issued, to the information display device 2. The predetermined period may be set at, for example, one hour, two hours or three hours as appropriate.

If the equipment control unit 21 of the information display device 2 receives provision of the spot information from the server 1, the equipment control unit 21, for example, causes an icon of the spot corresponding to the spot information provided from the server 1 to be displayed on the map displayed on the display device 7 on the basis of the map information.

Figure 9:
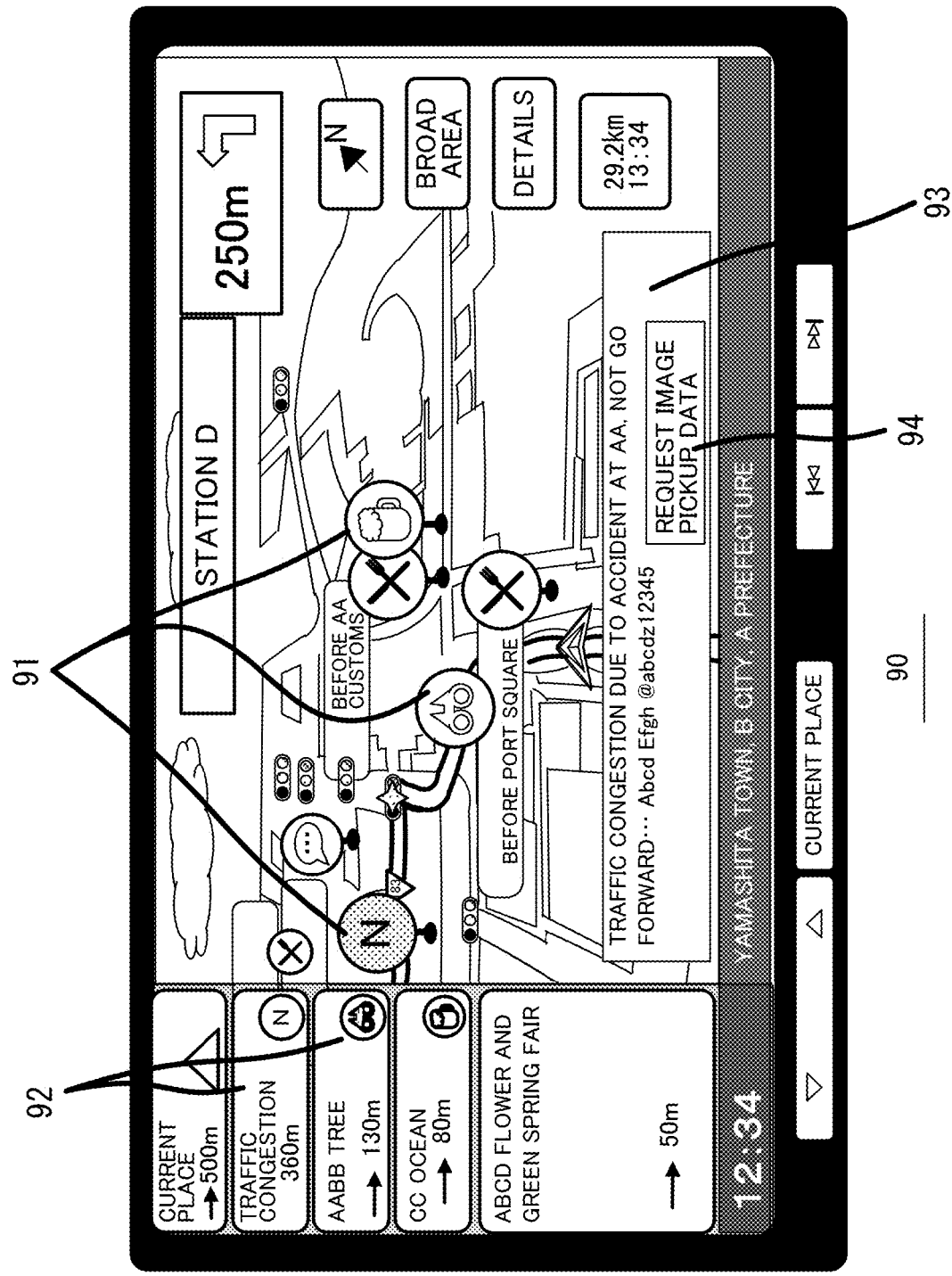
FIG. 9 illustrates an example of a display screen on which an icon of a spot corresponding to spot information is displayed according to the embodiment.

For example, as illustrated in FIG. 9, the display device 7 of the information display device 2 displays a display screen 90 including an icon 91 of the spot corresponding to the spot information. On the display screen 90, for example, the icon 91 corresponding to the spot information is displayed. A type of the icon 91 may be, for example, different in accordance with a category of the spot information corresponding to the icon 91 or a feeling word included in the post information of the spot information. Further, a spot information field 92 is displayed on the display screen 90 of the display device 7. The spot information field 92 indicates simple information regarding the spot displayed as the icon 91. The information to be displayed in the spot information field 92 is generated on the basis of the spot information corresponding to the icon 91. Note that in one example, the information to be displayed in the spot information field 92 may include information collected from other databases on the basis of a word included in the spot information. The spot information to be used for display on the display screen 90 may be, for example, spot information indicating a recommended spot extracted on the basis of information indicating a favorite spot of the user of the information display device 2, history of past spot search, history of past spot selection and information regarding hobby and preference of the user. The spot information indicating a recommended spot may be extracted by the control unit 11 of the server 1 in one example or may be extracted by the equipment control unit 21 of the information display device 2 in another example. The spot information indicating a recommended spot may be extracted using machine learning. The icon 91 is one example of second information corresponding to the spot information.

Further, in the example in FIG. 9, the icon 91 of "N" indicating the category of news is selected, and information on the selected icon 91 is displayed in a display field 93. In the example in FIG. 9, the selected icon 91 of "N" indicating the category of news is an icon generated on the basis of spot information regarding traffic congestion, and a message generated on the basis of post information of the spot information regarding the traffic congestion is displayed in the display field 93. The user of the information display device 2 can know that someone makes a post regarding traffic congestion and the traffic congestion occurs by viewing the display field 93 on the display screen 90.

Further, in a case where the icon 91 corresponding to spot information regarding traffic congestion is selected, a button 94 for requesting image pickup data may be displayed in the display field 93. For example, in a case where the user of the information display device 2 desires to check a situation of the traffic congestion by viewing an image or a video, the user can input a request for checking image pickup data to the information display device 2 by selecting the button 94. The information display device 2, for example, executes processing of acquiring image pickup information if the request for checking image pickup data is input. The button 94 is one example of first information for receiving a request for image pickup data regarding the spot information.

An example of operation flow of image pickup information acquisition processing to be executed by the equipment control unit 21 of the information display device 2 according to the embodiment will be described below using FIG. 10.

In S1001, the equipment control unit 21 determines whether or not a position indicated by position information of the spot information regarding the traffic congestion for which the request for checking image pickup data is input is on a route from a current position of the moving body on which the information display device 2 is mounted to a position of a destination. In a case where the position indicated by the position information of the spot information regarding the traffic congestion is not on the route (S1001: NO), the flow proceeds to S1002.

In S1002, the equipment control unit 21 transmits a request for providing image pickup information including the position information of the spot information regarding the traffic congestion for which the request for checking image pickup data is input, to the server 1 via the equipment communication device 23.

In S1003, the equipment control unit 21 controls the equipment communication device 23 to receive image pickup information on a vicinity of the position indicated by the position information of the spot information regarding the traffic congestion from the server 1 as a response to the request for providing image pickup information.

In S1004, the equipment control unit 21 outputs the image pickup data on the basis of the received image pickup information. For example, the equipment control unit 21 outputs the image pickup data included in the received image pickup information to the display device 7 and causes an image or a video of the image pickup data to be displayed on the display screen of the display device 7. In another example, the equipment control unit 21 may cause an icon to be displayed at a position indicated by the position information of the image pickup information on the display screen of the display device 7. The icon includes, for example, a thumbnail image of the image pickup data. For example, in a case where the user selects the icon via the equipment input device 25 or the like, the equipment control unit 21 may output the image pickup data of the selected icon to the display device 7 and cause an image or a video of the image pickup data to be displayed on the display screen of the display device 7. Note that in the processing in S1004, the equipment control unit 21, for example, operates as the output unit 26.

Further, in S1001, in a case where the position indicated by the position information of the spot information regarding the traffic congestion is on the route (S1001: YES), the flow proceeds to S1005. In S1005, the equipment control unit 21 controls the equipment communication device 23 to transmit a request for providing image pickup information including route information from the current position of the moving body on which the information display device 2 is mounted to the position of the destination and the position information of the spot information regarding the traffic congestion to the server 1.

In S1006, the equipment control unit 21 controls the equipment communication device 23 to receive image pickup information along the route from the server 1 as a response to the request for providing image pickup information.

In S1007, the equipment control unit 21 outputs image pickup data along the route on the basis of the received image pickup information. For example, the equipment control unit 21 causes an icon to be displayed at a position indicated by the position information of the received image pickup information along the route on the display screen of the display device 7. The icon includes, for example, a thumbnail image of the image pickup data. For example, in a case where the user selects the icon including the thumbnail image of the image pickup data via the equipment input device 25, the equipment control unit 21 may output the image pickup data of the selected icon to the display device 7 and cause an image or a video of the image pickup data to be displayed on the display screen of the display device 7. Note that in the processing in S1007, the equipment control unit 21, for example, operates as the output unit 26. If output of the image pickup data is completed, the present operation flow ends.

Figure 10:
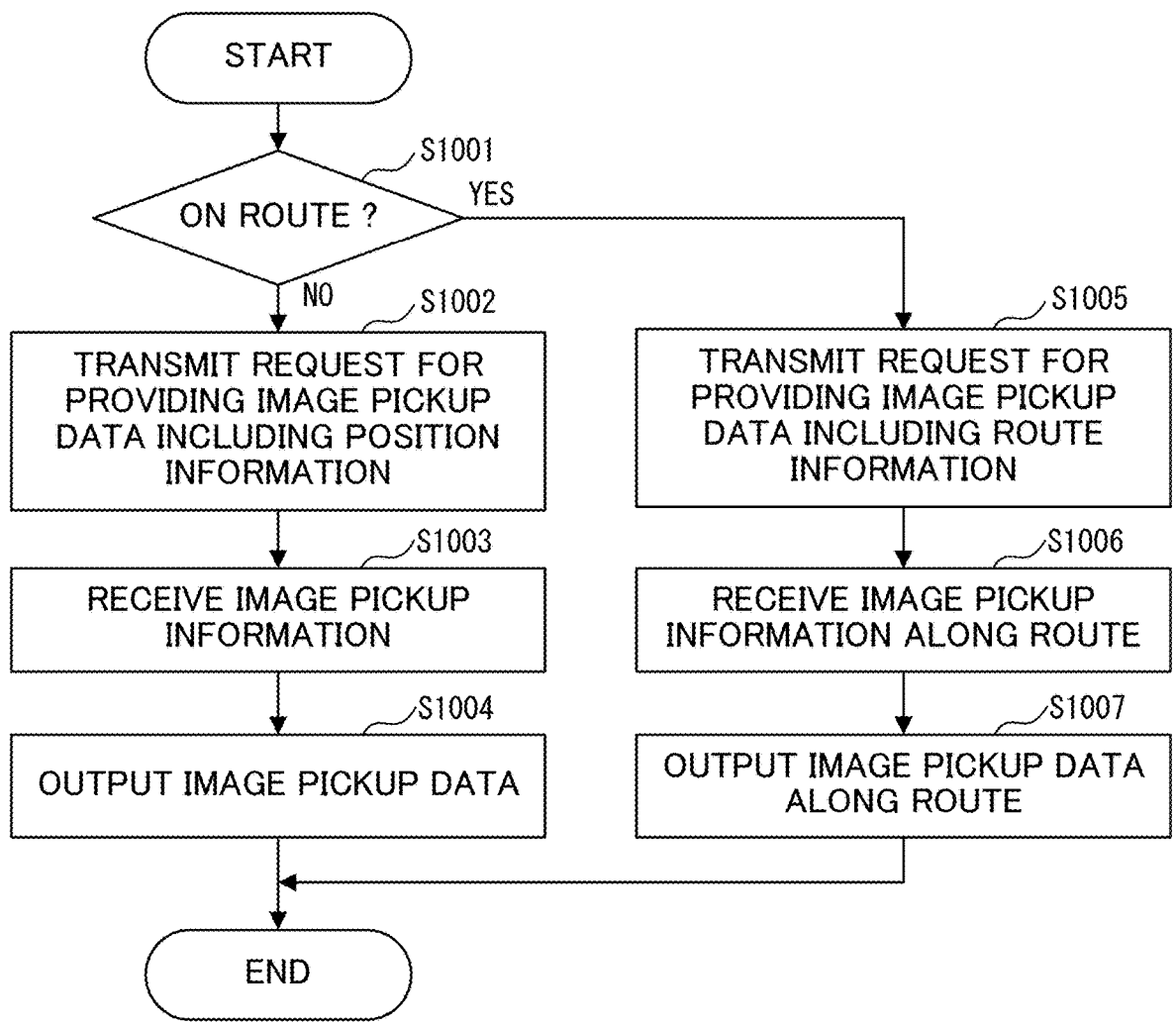
FIG. 10 illustrates an example of operation flow of image pickup information acquisition processing according to the embodiment.

As described above, according to the operation flow illustrated in FIG. 10, the information display device 2 can allow the user to grasp a situation of the traffic congestion with an image or a video by receiving provision of the image pickup data corresponding to the spot information regarding the traffic congestion. In a case where the position indicated by the position information of the spot information regarding the traffic congestion is along the route, the information display device 2 can allow the user to grasp a situation of the traffic congestion with an image or a video by receiving provision of the image pickup data along the route.

Figure 11:
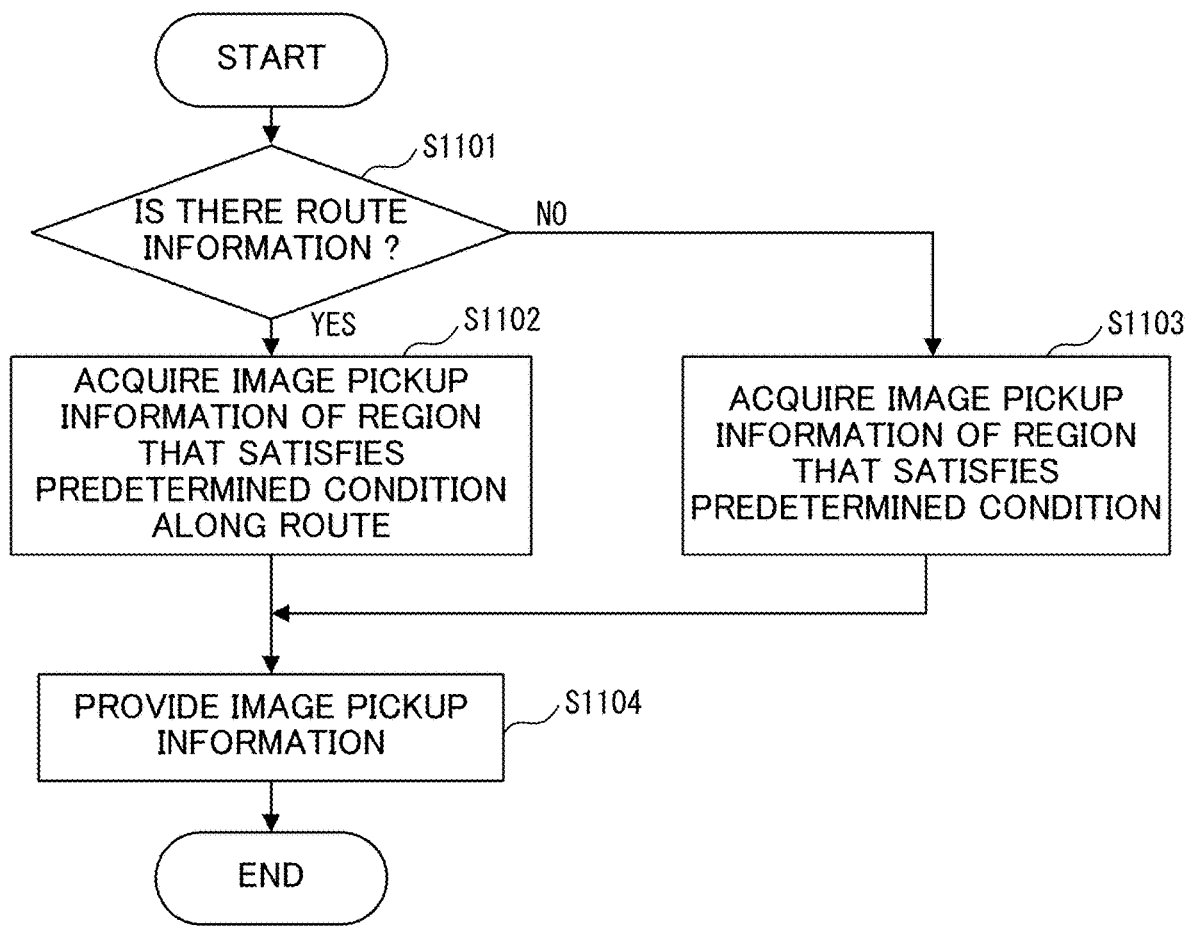
FIG. 11 illustrates an example of operation flow of image pickup information provision processing according to the embodiment.

An example of operation flow of image pickup information provision processing to be executed by the control unit 11 of the server 1 according to the embodiment will be described below using FIG. 11. The control unit 11 of the server 1 starts the operation flow in FIG. 11, for example, if the communication device 12 receives a request for providing image pickup information from the information display device 2.

In S1101, the control unit 11 of the server 1 determines whether or not the received request for providing image pickup information includes route information. In a case where the received request for providing image pickup information includes route information (S1101: YES), the flow proceeds to S1102.

In S1102, the control unit 11 acquires image pickup information of a region that satisfies a predetermined condition along the route, from the image pickup data management information 60. As the region that satisfies the predetermined condition along the route, for example, a region which is along the route within a first distance from the route included in the request for providing image pickup information and which is around the spot information regarding the traffic congestion, located within a second distance from the position information of the spot information regarding the traffic congestion can be used. Note that the image pickup information of the image pickup data management information 60, for example, only requires to be collected from the information processing equipment 5 in advance at a predetermined timing. In another embodiment, the control unit 11 may transmit a request to the information processing equipment 5 of a collection target moving body located in the region that satisfies the predetermined condition along the route at a timing at which the processing of S1102 is executed, via the communication device 12 and collect the image pickup information including the latest image pickup data. The latest image pickup data is, for example, data picked up within a predetermined period such as last 30 seconds. When the control unit 11 collects the image pickup information from the information processing equipment 5, the control unit 11, for example, operates as the collection unit 14.

Further, in a case where the request for providing image pickup information does not include route information in S1101 (S1101: NO), the flow proceeds to S1103.

In S1103, the control unit 11 acquires image pickup information on a region that satisfies the predetermined condition from the image pickup data management information 60. The region that satisfies the predetermined condition may be, for example, a region which is around the spot information regarding the traffic congestion, located within a third distance from the position information of the spot information regarding the traffic congestion included in the request for providing image pickup information. Note that the image pickup information of the image pickup data management information 60 may be, for example, collected from the information processing equipment 5 in advance at a predetermined timing. In another embodiment, the control unit 11 may transmit a request to the information processing equipment 5 of the moving body located in the region that satisfies the predetermined condition at a timing at which the processing of S1103 is executed via the communication device 12 and collect image pickup information including the latest image pickup data. The latest image pickup data is, for example, data picked up within a predetermined period such as last 30 seconds. When the control unit 11 collects the image pickup information from the information processing equipment 5, the control unit 11, for example, operates as the collection unit 14.

In S1104, the control unit 11 provides the acquired image pickup information to the information display device 2 via the communication device 12, and the present operation flow ends. Note that the control unit 11 may, for example, transmit all the image pickup data collected from the information processing equipment 5 to the information display device 2 or may transmit the image pickup data to the information display device 2 after thinning out some frames. As an example, the control unit 11 transmits only I frame (intra-coded frame) obtained by performing encoding without using inter-frame prediction in compression coding of a moving image among the image pickup data. Note that in a similar manner, the control unit 11 may collect image pickup data while thinning out some frames also when the control unit 11 collects the image pickup data from the information processing equipment 5. By transmitting and receiving the image pickup data after thinning out some frames, it is possible to reduce a communication amount. In the processing in S1104, the control unit 11, for example, operates as the provision unit 16.

(Modification)

Note that in the above-described embodiment, the information display device 2 may further have a function of a dashboard camera. Further, for example, the information display device 2 may operate in coordination with a dashboard camera mounted on the same moving body. The dashboard camera may have the same structure as the structure of the information processing equipment 5. For example, the information display device 2 may collect image pickup data picked up at the image pickup device 6 provided at the dashboard camera. In a case where the information display device 2 has a function of a dashboard camera, the image pickup information can be provided to the server 1 in a similar manner to the information processing equipment 5 in the above-described embodiment.

In the modification, in a case where there is spot information regarding traffic congestion within a predetermined distance, the information display device 2 executes processing of transmitting image pickup information including image pickup data picked up at the image pickup device 6 of the dashboard camera to the server 1 via the equipment communication device 23.

An example of operation flow of image pickup information transmission processing to be executed by the equipment control unit 21 of the information display device 2 according to the modification will be described below using FIG. 12. For example, the equipment control unit 21 of the information display device 2 starts the operation flow in FIG. 12 if the information display device 2 is activated.

In S1201, the equipment control unit 21 of the information display device 2 acquires a current position at the position information acquisition device 22. In S1202, the equipment control unit 21 transmits a request for providing spot information including the current position to the server 1 via the equipment communication device 23 and receives spot information on a vicinity of the current position from the server 1. The spot information on the vicinity of the current position is, for example, spot information within a predetermined distance from the current position.

In S1203, the equipment control unit 21 determines whether or not the spot information within the predetermined distance from the current position received from the server 1 includes spot information regarding traffic congestion. In a case where the spot information does not include spot information regarding traffic congestion (S1203: NO), the flow returns to S1201.

On the other hand, in a case where the spot information received from the server 1 includes spot information regarding traffic congestion (S1203: YES), the flow proceeds to S1204.

In S1204, the equipment control unit 21 transmits image pickup data in a latest predetermined period picked up at the image pickup device 6 of the dashboard camera to the server 1 via the equipment communication device 23, and the flow returns to S1201. Note that in a case where the processing returns to S1201, the equipment control unit 21 may execute the processing in S1201 after a predetermined period has elapsed and repeat the processing.

Figure 12:
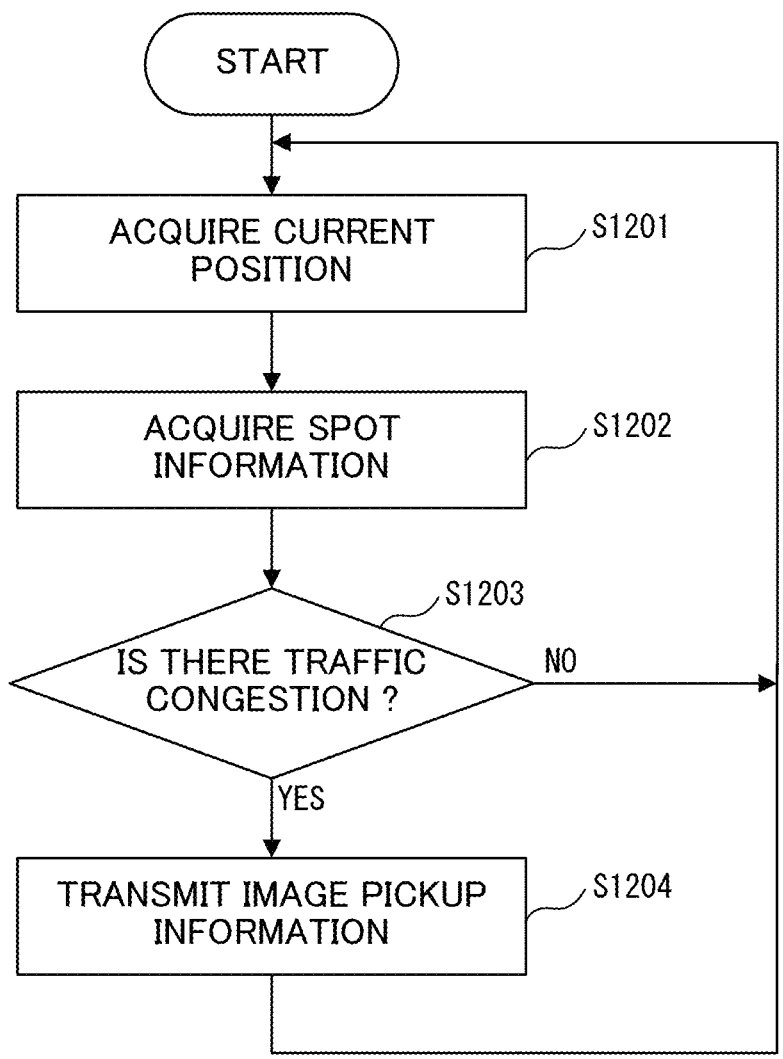
FIG. 12 illustrates an example of operation flow of image pickup information transmission processing according to a modification.

According to the operation flow in FIG. 12, in a case where there is spot information regarding traffic congestion near the moving body on which the information display device 2 is mounted, the information display device 2 can provide image pickup information including image pickup data obtained by picking up an image of a situation around the information display device 2 to the server 1.

As described in the above embodiment, the information processing system 20 includes, for example, the collection unit 14, the generation unit 15, the storage device 13, and the provision unit 16. The collection unit 14, for example, collects image pickup data picked up at the image pickup device 6 of the information processing equipment 5 held by the moving body. The image pickup data includes, for example, image pickup position information indicating a position regarding image pickup of the image pickup data. The generation unit 15, for example, generates spot information in which information regarding a spot is associated with position information indicating a position of the spot. The information regarding the spot is, for example, specified on the basis of the post posted on the social networking service. The storage device 13, for example, stores the spot information in the spot management information 50. In a case where a request for providing image pickup data for the spot information is received, the provision unit 16, for example, provides image pickup data which is located in a region that satisfies a predetermined condition for a position indicated by the spot information and which is collected by the collection unit 14.

Further, the information processing system 20 may further include, for example, a route search unit that searches for a route from a current position to a position of a destination. As described in the above modification, the request for providing image pickup data may include route information indicating a route. In a case where a request for providing image pickup data for the spot information is received, the provision unit 16, for example, provides image pickup data along the route indicated by the route information.

Further, in a case where the collection unit 14 receives a request for providing image pickup data for the spot information, the collection unit 14 may collect image pickup data located in a region that satisfies a predetermined condition for a position indicated by the position information of the spot information.

Still further, the information processing system 20 may include, for example, the information display device 2. The information display device 2, for example, includes the output unit 26. The output unit 26, for example, outputs a request for providing image pickup data for the spot information. The output unit 26, for example, outputs the image pickup data provided from the provision unit 16 in response to the request for providing image pickup data.

Further, as described in the above modification, the information display device 2 may have a function of a dashboard camera. The information display device 2 may, for example, include the transmission unit 27. In a case where there is spot information within a predetermined distance from the current position, the transmission unit 27, for example, transmits the image pickup data picked up at the image pickup device 6 of the dashboard camera to the collection unit 14.

Thus, according to the embodiment, in a case where a post is made on the SNS, it is possible to allow the user to grasp a situation indicated by the post with an image or a video.

Further, according to the embodiment, in a case where a post is made on the SNS, it is possible to provide a situation of traffic congestion indicated by the post with an image or a video.

Note that while in the above-described embodiment, description has been provided using an example of spot information regarding traffic congestion, the embodiment is not limited. For example, image pickup data requested in the request for providing image pickup data for the spot information may be, for example, image pickup data regarding traffic information, facility information or weather information. Examples of the traffic information can include traffic congestion, an accident, construction work, flooding and road closure. Examples of the facility information can include information indicating that a facility is crowded and information indicating that a facility is open or closed. Examples of the weather information can include information indicating lightning, sudden rainfall and start of rainfall.

Further, the above-described operation flow is an example, and the embodiment is not limited. If possible, the operation flow may be executed in a changed order or may include further processing, or part of processing may be omitted.

Further, in the above-described embodiment, the information processing equipment 5 may transmit image pickup information including image pickup data picked up by the image pickup device 6, image pickup date and time, and image pickup position information to the server 1 at a predetermined time intervals or at a predetermined timing such as upon passage of a predetermined point set on a road as one example. In another example, the information processing equipment 5 may transmit image pickup information including image pickup data picked up by the image pickup device 6, the image pickup date and time and the image pickup position information to the server 1 at a timing at which an instruction is received from the server 1.

Further, as the machine learning in the embodiment, model learning using teacher data may be performed.

Each processing or each function in the embodiment may be implemented through integrated processing by a single device or a single system or through distributed processing by a plurality of devices or a plurality of systems. Further, each component in the embodiment may be constituted with dedicated hardware. Each component that can be implemented with software in the embodiment may be implemented through execution of a program.

Some embodiments have been described above. However, it should be understood that the embodiments are not limited to the above-described embodiments and incorporate various modifications of the above-described embodiments and alternative embodiments. For example, it should be understood that various embodiments can be embodied by modifying components within a range not deviating from the gist and the scope. Further, it should be understood that various embodiments can be implemented by combining a plurality of components disclosed in the above-described embodiments as appropriate. Still further, it should be understood by a person skilled in the art that various embodiments can be implemented by deleting some components from all the components described in the embodiments or adding some components to the components described in the embodiment.

What is claimed is:

1. An information processing system comprising a server and an information display device,
    the server including:
        a first processor configured to collect image pickup data picked up by a plurality of image pickup devices each of which is held by each of a plurality of moving bodies and picks up an image around each of the plurality of moving bodies and generate spot information in which information regarding a spot specified on a basis of a post posted on a social networking service is associated with position information indicating a position of the spot;
        a storage device configured to store the spot information; and
        a first communication device configured to transmit the spot information to the information display device,
    the information display device including:
        a screen display device configured to display a screen including first information for receiving a request for image pickup data regarding the spot information; and a second communication device configured to transmit to the server request information including the position information of the spot information and route information indicating a first route from a current position to a position of a destination when the first information is selected by a user on the screen, wherein the first processor transmits a request to a particular moving body of the plurality of moving bodies when the first communication device receives the request information from the information display device, the particular moving body being located in a region that is along a second route from the current position to the position of the destination, the second route being within a first distance from the first route included in the request information, and is located within a second distance from the position indicated by the position information included in the request information, and the first communication device transmits the image pickup data picked up by an image pickup device held by the particular moving body to the information display device.

2. The information processing system according to claim 1, wherein the screen display device displays second information corresponding to the spot information so as to be superimposed on a map, and when the second information is selected by the user, displays the screen including the information regarding the spot of the spot information and the first information.

3. The information processing system according to claim 2, wherein the storage device further stores category information in which a category for classifying the post is associated with a word belonging to the category, the spot information includes a category specified from a word included in the post on a basis of the category information, and the second information includes information indicating the category of the spot information.

4. The information processing system according to claim 1, wherein the information display device further includes a second processor configured to search for the first route.

5. An information processing method comprising:

generating by a processor, spot information in which information regarding a spot specified on a basis of a post posted on a social networking service is associated with position information indicating a position of the spot;

transmitting the spot information to an information display device;

receiving from the information display device request information including the position information of the spot information and route information indicating a first route from a current position to a position of a destination when a screen including first information for receiving a request for image pickup data regarding the spot information is displayed by the information display device, the first information is selected by a user on the screen, and the request information is transmitted from the information display device;

transmitting a request to a particular moving body of a plurality of moving bodies when receiving the request information from the information display device, the particular moving body being located in a region that is along a second route from the current position to the position of the destination, the second route being within a first distance from the first route included in the request information, and is located within a second distance from the position indicated by the position information included in the request information;

collecting by the processor, image pickup data picked up by an image pickup device held by the particular moving body; and transmitting the image pickup data picked up by the image pickup device held by the particular moving body to the information display device.

6. A non-transitory computer-readable recording medium having stored therein an information processing program that causes a computer to execute a process comprising:

generating spot information in which information regarding a spot specified on a basis of a post posted on a social networking service is associated with position information indicating a position of the spot;

transmitting the spot information to an information display device;

receiving from the information display device request information including the position information of the spot information and route information indicating a first route from a current position to a position of a destination when a screen including first information for receiving a request for image pickup data regarding the spot information is displayed by the information display device, the first information is selected by a user on the screen, and the request information is transmitted from the information display device;

transmitting a request to a particular moving body of a plurality of moving bodies when receiving the request information from the information display device, the particular moving body being located in a region that is along a second route from the current position to the position of the destination, the second route being within a first distance from the first route included in the request information, and is located within a second distance from the position indicated by the position information included in the request information;

collecting image pickup data picked up by an image pickup device held by the particular moving body; and transmitting the image pickup data picked up by the image pickup device held by the particular moving body to the information display device.

* * * * *